United States Patent
Fu

(10) Patent No.: US 12,490,318 B2
(45) Date of Patent: Dec. 2, 2025

(54) METHOD AND APPARATUS FOR DEVICE-TO-DEVICE COMMUNICATION

(71) Applicant: Telefonaktiebolaget LM Ericsson (publ), Stockholm (SE)

(72) Inventor: Zhang Fu, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 391 days.

(21) Appl. No.: 17/926,640

(22) PCT Filed: May 13, 2021

(86) PCT No.: PCT/CN2021/093622
§ 371 (c)(1),
(2) Date: Nov. 21, 2022

(87) PCT Pub. No.: WO2021/233200
PCT Pub. Date: Nov. 25, 2021

(65) Prior Publication Data
US 2023/0209618 A1    Jun. 29, 2023

(30) Foreign Application Priority Data

May 22, 2020  (WO) ................ PCT/CN2020/091891

(51) Int. Cl.
*H04W 76/11*    (2018.01)
*H04W 76/14*    (2018.01)
*H04W 92/18*    (2009.01)

(52) U.S. Cl.
CPC ............ *H04W 76/11* (2018.02); *H04W 76/14* (2018.02); *H04W 92/18* (2013.01)

(58) Field of Classification Search
CPC ...... H04W 46/11; H04W 76/14; H04W 92/18
See application file for complete search history.

(56) References Cited

U.S. PATENT DOCUMENTS

| 2016/0212780 A1 | 7/2016 | Stojanovski |
| 2016/0270134 A1 | 9/2016 | Stojanovski |

(Continued)

FOREIGN PATENT DOCUMENTS

WO     2018196497 A1    11/2018

OTHER PUBLICATIONS

InterDigital Inc., "Solution for Key Issue #4 Support of UE-to-UE Relay," SA-2001488, 3GPP TSG-SA WG2 Meeting #136AH, Icheon, Korea, Jan. 13-17, 2020 (Year: 2020).*

(Continued)

*Primary Examiner* — Brian P Cox
(74) *Attorney, Agent, or Firm* — Withrow & Terranova, PLLC

(57) ABSTRACT

Various embodiments of the present disclosure provide a method for direct device-to-device communication. The method which may be performed by a first device comprises generating an Internet protocol address of the first device. The Internet protocol address of the first device may be applicable for direct device-to-device communication between the first device and a second device via a third device. The method further comprises transmitting the Internet protocol address to the third device. According to various embodiments of the present disclosure, the relaying for direct device-to-device communication may be implemented efficiently and flexibly.

19 Claims, 14 Drawing Sheets

(56) References Cited

U.S. PATENT DOCUMENTS

2017/0164332 A1    6/2017  Kim et al.
2018/0077112 A1    3/2018  Zhou et al.
2022/0369215 A1*  11/2022  Dees .................... H04W 76/14

OTHER PUBLICATIONS

Catt, "S2-2000808: Solution to support UE-to-UE Relay," 3GPP TSG-SA WG2 Meeting #136AH, Jan. 13-17, 2020, Incheon, Korea, 3 pages.
Extended European Search Report for European Patent Application No. 21808864.9, mailed May 24, 2024, 12 pages.
Author Unknown, "Technical Specification Group Services and System Aspects; Architecture enhancements for 5G System (5GS) to support Vehicle-to-Everything (V2X) services (Release 16)," Technical Specification 23.287, Version 16.2.0, Mar. 2020, 3GPP Organizational Partners, 53 pages.
Author Unknown, "Technical Specification Group Services and System Aspects; Study on system enhancement for Proximity based Services (ProSe) in the 5G System (5GS) (Release 17)," Technical Specification 23.752, Version 0.3.0, Jan. 2020, 3GPP Organizational Partners, 73 pages.
Author Unknown, "Technical Specification Group Services and System Aspects; Telecommunication management; Charging management; Proximity-based Services (Pro Se) charging (Release 15)," Technical Specification 32.277, Version 15.1.0, Jun. 2018, 3GPP Organizational Partners, 118 pages.
International Search Report and Written Opinion for International Patent Application No. PCT/CN2021/093622, mailed Aug. 12, 2021, 9 pages.

* cited by examiner

US 12,490,318 B2

METHOD AND APPARATUS FOR DEVICE-TO-DEVICE COMMUNICATION

This application is a 35 U.S.C. § 371 national phase filing of International Application No. PCT/CN2021/093622, filed May 13, 2021, which claims the benefit of International Application No. PCT/CN2020/091891, filed May 22, 2020, the disclosures of which are incorporated herein by reference in their entireties.

FIELD OF THE INVENTION

The present disclosure generally relates to communication networks, and more specifically, to a method and apparatus for device-to-device (D2D) communication.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the evolution of wireless communication, a requirement for supporting D2D communication features in various applications is proposed. An extension for the D2D work may consist of supporting vehicle-to-everything (V2X) communication, which may include any combination of direct communications among vehicles, pedestrians and infrastructure. Wireless communication networks such as long-term evolution (LTE) and new radio (NR) networks may be expected to use V2X services and support communication for V2X capable user equipment (UE).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In a wireless communication network, V2X services may be used by various applications to meet different communication requirements. Direct unicast transmission over a sidelink (SL) between two V2X capable UEs (also called V2X UEs for short) may be needed in some applications such as platooning, cooperative driving, dynamic ride sharing, etc. For the case that the network environment is not suitable for two V2X capable UEs to establish single hop SL unicast communication, multi-hop SL unicast communication may be expected for the two UEs. For example, a relay UE may be used to forward data between a source UE (i.e. a UE initiating the communication) and a target UE (i.e. a destination of the communication). The relay UE may act as a domain name system (DNS) server to allocate an Internet Protocol (IP) address/prefix to the source/target UE, and the source/target UE may send a DNS query for the target/source UE to the relay UE. Since the IP address is allocated by the relay UE, the source/target UE may have to change its IP address if the source/target UE switches to another relay UE, which may impact data transmission between the source UE and the target UE. Therefore, it may be desirable to support relaying for communications between UEs more efficiently.

Various exemplary embodiments of the present disclosure propose a solution for D2D communication, which can enable a UE to use its local IP address (e.g. a link-local Internet Protocol version 6 (IPv6) address) to establish a connection with a peer UE via a relay UE, so that the UE may not need to support a DNS protocol. In addition, the UE may not have to change its IP address due to relaying path switch, and thus the session/service continuity can be preserved.

It can be appreciated that the direct D2D communication described in this document may refer to D2D communication via sidelink, or any other types of communication that occurs directly between devices without via infrastructure. In addition, it can be appreciated that the direct D2D communication described in this document may be implemented by adopting relaying (e.g. relaying based on layer-3, etc.) for a path between a source device and a target device of the direct D2D communication.

It can be appreciated that the "relay UE" may also be referred to as a UE-to-UE relay UE (or a UE-to-UE relay, or a relay for short) that is capable of acting as a relay device for other UEs. As an example, the relay UE may be a proximity services (ProSe) 5G UE-to-UE relay as defined in the 3rd generation partnership project (3GPP) technical specification (TS) 23.752 V0.3.0, where the entire content of this technical specification is incorporated into the present disclosure by reference. The terms "relay UE", "UE-to-UE relay" and "relay" may be used interchangeably in this document.

Similarly, it can be appreciated that the "source UE" and the "target UE" may also be referred to as a remote UE that may communicate with a relay UE with the SL interface and establish a unicast Layer 2 (L2) link to another remote UE via the relay UE. As an example, the remote UE may be a 5G ProSe-enabled UE that communicates with a data network (DN) via a 5G ProSe UE-to-Network relay as defined in 3GPP TS 23.752 V0.3.0.

According to a first aspect of the present disclosure, there is provided a method performed by a first device such as a UE. The method comprises generating an IP address of the first device. The IP address of the first device may be applicable for direct D2D communication between the first device and a second device via a third device. In accordance with an exemplary embodiment, the method further comprises transmitting the IP address of the first device to the third device.

In accordance with an exemplary embodiment, the generation of the IP address of the first device may be triggered by setting up a connection between the first device and the third device. In accordance with another exemplary embodiment, the generation of the IP address of the first device may be triggered by a first indicator transmitted from the third device to the first device to indicate an IP address conflict.

In accordance with an exemplary embodiment, the method according to the first aspect of the present disclosure may further comprise: transmitting a message to the third device to request an IP address of the second device. In an embodiment, the request may include an application layer identifier of the second device.

In accordance with an exemplary embodiment, the method according to the first aspect of the present disclosure may further comprise: obtaining an IP address of the second device which may be generated by the second device. In an embodiment, the first device may obtain the IP address of the second device from the third device.

In accordance with an exemplary embodiment, the method according to the first aspect of the present disclosure may further comprise: communicating with the second device via the third device, based at least in part on the IP address of the second device.

In accordance with an exemplary embodiment, the IP address may be a link-local IPv6 address.

According to a second aspect of the present disclosure, there is provided an apparatus which may be implemented as a first device. The apparatus may comprise one or more processors and one or more memories storing computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a first device. The apparatus may comprise a generating unit and a transmitting unit. In accordance with some exemplary embodiments, the generating unit may be operable to carry out at least the generating step of the method according to the first aspect of the present disclosure. The transmitting unit may be operable to carry out at least the transmitting step of the method according to the first aspect of the present disclosure.

According to a fifth aspect of the present disclosure, there is provided a method performed by a third device such as a UE. The method comprises receiving an IP address (e.g. a link-local IPv6 address, etc.) of a first device from the first device. The IP address of the first device may be generated by the first device and applicable for direct D2D communication between the first device and a second device via the third device. In accordance with an exemplary embodiment, the method further comprises determining a first mapping between the IP address of the first device and an identifier of the first device.

In accordance with some exemplary embodiments, the first, second and third devices described according to the fifth aspect of the present disclosure may correspond to the first, second and third devices described according to the first aspect of the present disclosure, respectively.

In accordance with an exemplary embodiment, the identifier of the first device may be an application layer identifier of the first device.

In accordance with an exemplary embodiment, the generation of the IP address of the first device according to the fifth aspect of the present disclosure may correspond to the generation of the IP address of the first device according to the first aspect of the present disclosure.

In accordance with an exemplary embodiment, the method according to the fifth aspect of the present disclosure may further comprise: receiving an IP address (e.g. a link-local IPv6 address, etc.) of the second device from the second device. The IP address of the second device may be generated by the second device and applicable for the direct D2D communication between the first device and the second device via the third device.

In accordance with an exemplary embodiment, the method according to the fifth aspect of the present disclosure may further comprise: determining a second mapping between the IP address of the second device and an identifier of the second device (e.g. an application layer identifier of the second device).

In accordance with an exemplary embodiment, the generation of the IP address of the second device may be triggered by setting up a connection between the second device and the third device. In accordance with another exemplary embodiment, the generation of the IP address of the second device may be triggered by a second indicator transmitted from the third device to the second device to indicate an IP address conflict.

In accordance with an exemplary embodiment, the method according to the fifth aspect of the present disclosure may further comprise: receiving a first message from the first device to request an IP address of the second device. In an embodiment, the first message may include an application layer identifier of the second device.

In accordance with an exemplary embodiment, the method according to the fifth aspect of the present disclosure may further comprise: providing an IP address of the second device to the first device, according to a second mapping between the IP address of the second device and an identifier of the second device.

In accordance with an exemplary embodiment, the method according to the fifth aspect of the present disclosure may further comprise: receiving a second message from the second device to request the IP address of the first device. In an embodiment, the second message may include an application layer identifier of the first device.

In accordance with an exemplary embodiment, the method according to the fifth aspect of the present disclosure may further comprise: providing the IP address of the first device to the second device, according to the first mapping between the IP address of the first device and the identifier of the first device.

In accordance with an exemplary embodiment, the method according to the fifth aspect of the present disclosure may further comprise: forwarding data between the first device and the second device, according to at least one of the IP address of the first device and an IP address of the second device.

According to a sixth aspect of the present disclosure, there is provided an apparatus which may be implemented as a third device. The apparatus may comprise one or more processors and one or more memories storing computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a third device. The apparatus may comprise a receiving unit and a determining unit. In accordance with some exemplary embodiments, the receiving unit may be operable to carry out at least the receiving step of the method according to the fifth aspect of the present disclosure. The determining unit may be operable to carry out at least the determining step of the method according to the fifth aspect of the present disclosure.

According to a ninth aspect of the present disclosure, there is provided a method performed by a first device such as a UE. The method comprises determining to change a path for direct D2D communication between the first device and a second device, from a first path via a third device to a second path via a fourth device. In accordance with an exemplary embodiment, the method further comprises communicating with the second device over the second path based at least in part on an IP address of the second device, after changing from the first path to the second path. The IP address of the second device may be generated by the second device.

It can be appreciated that the first, second and third devices described according to the ninth aspect of the present disclosure may or may not correspond to the first, second and third devices described according to the first/fifth aspect of the present disclosure, respectively.

In accordance with an exemplary embodiment, the IP address (e.g. a link-local IPv6 address, etc.) of the second device may also be used for communication between the first device and the second device over the first path.

In accordance with an exemplary embodiment, the method according to the ninth aspect of the present disclosure may further comprise: transmitting an IP address (e.g. a link-local IPv6 address, etc.) of the first device to the fourth device, prior to changing from the first path to the second path. The IP address of the first device may be generated by the first device.

In accordance with an exemplary embodiment, the generation of the IP address of the first device may be triggered by setting up a connection between the first device and the fourth device. In accordance with another exemplary embodiment, the generation of the IP address of the first device may be triggered by a third indicator transmitted from the fourth device to the first device to indicate an IP address conflict.

In accordance with an exemplary embodiment, the IP address of the second device may be received by the first device from the fourth device.

In accordance with an exemplary embodiment, the method according to the ninth aspect of the present disclosure may further comprise: transmitting first information to the second device through the first path to indicate a start of the communication over the second path.

In accordance with an exemplary embodiment, the method according to the ninth aspect of the present disclosure may further comprise: receiving second information from the second device through the first path to indicate a start of the communication over the second path.

According to a tenth aspect of the present disclosure, there is provided an apparatus which may be implemented as a first device. The apparatus may comprise one or more processors and one or more memories storing computer program codes. The one or more memories and the computer program codes may be configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus which may be implemented as a first device. The apparatus may comprise a determining unit and a communicating unit. In accordance with some exemplary embodiments, the determining unit may be operable to carry out at least the determining step of the method according to the ninth aspect of the present disclosure. The communicating unit may be operable to carry out at least the communicating step of the method according to the ninth aspect of the present disclosure.

According to a thirteenth aspect of the present disclosure, there is provided a method performed by a fourth device such as a UE. The method comprises maintaining a first mapping between an IP address of a first device and an identifier of the first device, and a second mapping between an IP address of a second device and an identifier of the second device. The IP address of the first device may be generated by the first device, and the IP address of the second device may be generated by the second device. In accordance with an exemplary embodiment, the method further comprises forwarding data between the first device and the second device, according to at least one of the IP address of the first device and the IP address of the second device, after a path for direct D2D communication between the first device and the second device is changed from a first path via a third device to a second path via the fourth device.

In accordance with some exemplary embodiments, the first, second, third an fourth devices described according to the thirteenth aspect of the present disclosure may correspond to the first, second, third and fourth devices described according to the ninth aspect of the present disclosure, respectively.

In accordance with an exemplary embodiment, the generation of the IP address of the first device according to the thirteenth aspect of the present disclosure may correspond to the generation of the IP address of the first device according to the ninth aspect of the present disclosure.

In accordance with an exemplary embodiment, the generation of the IP address of the second device may be triggered by setting up a connection between the second device and the fourth device. In accordance with another exemplary embodiment, the generation of the IP address of the second device may be triggered by a fourth indicator transmitted from the fourth device to the second device to indicate an IP address conflict.

In accordance with an exemplary embodiment, the at least one of the IP address of the first device and the IP address of the second device may also be used for communication between the first device and the second device over the first path.

In accordance with an exemplary embodiment, the IP address of the first device may be received by the fourth device from the first device. In accordance with another exemplary embodiment, the IP address of the second device may be received by the fourth device from the second device.

In accordance with an exemplary embodiment, the method according to the thirteenth aspect of the present disclosure may further comprise: providing the IP address of the first device to the second device, according to the first mapping.

In accordance with an exemplary embodiment, the method according to the thirteenth aspect of the present disclosure may further comprise: providing the IP address of the second device to the first device, according to the second mapping.

According to a fourteenth aspect of the present disclosure, there is provided an apparatus which may be implemented as a fourth device. The apparatus may comprise one or more processors and one or more memories storing computer program codes. The one or more memories and the computer program codes may be configured to, with the one or more processors, cause the apparatus at least to perform any step of the method according to the thirteenth aspect of the present disclosure.

According to a fifteenth aspect of the present disclosure, there is provided a computer-readable medium having computer program codes embodied thereon which, when executed on a computer, cause the computer to perform any step of the method according to the thirteenth aspect of the present disclosure.

According to a sixteenth aspect of the present disclosure, there is provided an apparatus which may be implemented as a fourth device. The apparatus may comprise a maintaining unit and a forwarding unit. In accordance with some exemplary embodiments, the maintaining unit may be operable to carry out at least the maintaining step of the method according to the thirteenth aspect of the present disclosure. The forwarding unit may be operable to carry out at least the forwarding step of the method according to the thirteenth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
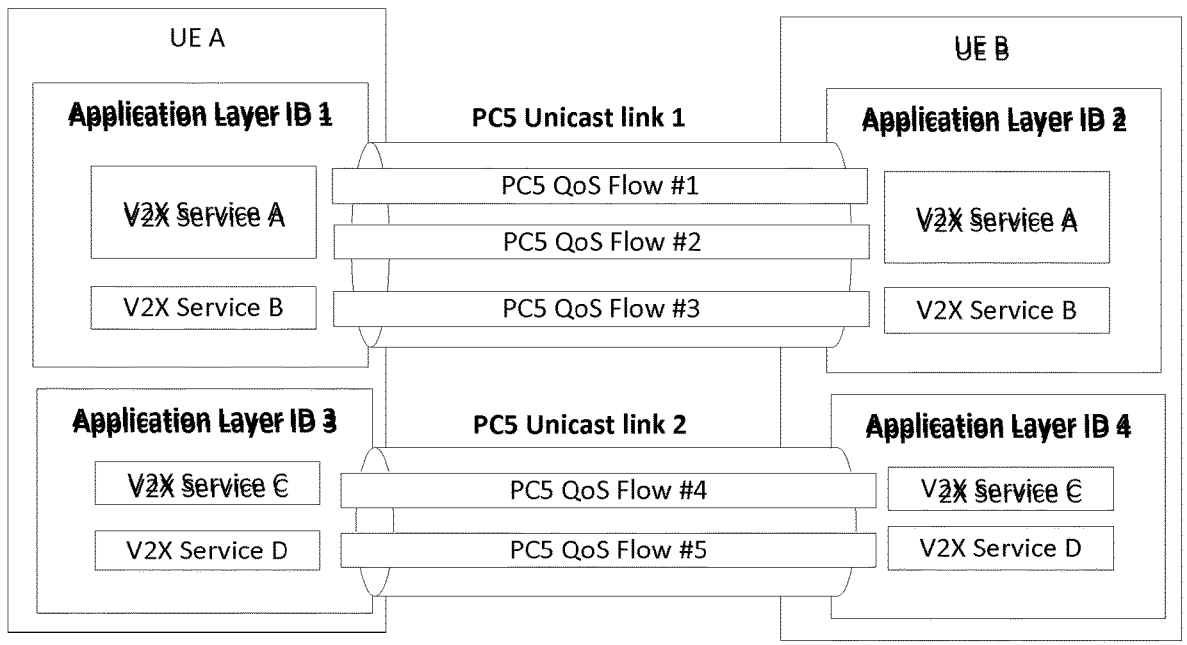
FIG. 1 is a diagram illustrating exemplary NR SL unicast links between two UEs according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. To meet dramatically increasing network requirements on traffic capacity and data rates, one interesting option for communication technique development is to allow D2D communications to be implemented in a wireless communication network such as 4G/LTE or 5G/NR network. As used herein, D2D may be referred to in a broader sense to include communications between any types of UEs, and include V2X communications between a vehicle UE and any other type of UE. D2D and/or V2X may be a component of many existing wireless technologies when it comes to direct communication between wireless devices. D2D and/or V2X communications as an underlay to cellular networks may be proposed as an approach to take advantage of the proximity of devices.

When it comes to the sidelink (SL) interface, the first standardization effort in 3GPP dates back to Release 12, targeting public safety use cases. The SL interface may be specified to allow a UE directly communicating with the peer UE without sending the packet to the network (NW). Besides, a UE-to-NW relay solution may also be defined such that a remote UE out of cell coverage can still reach the NW via a relay UE. The remote UE may communicate with the relay UE with the SL interface and the relay UE may have uplink and downlink connections with a cell in the NW.

Since then, a number of enhancements are introduced with the objective to enlarge the use cases that may benefit from the D2D technology. In particular, in LTE Release 14 and Release 15, the extensions for the D2D work may consist of support of V2X communications, including any combination of direct communications between vehicles, pedestrians and the infrastructure.

While LTE V2X mainly aims at traffic safety services, NR V2X may have a much broader scope including not only basic safety services but also targeting non-safety applications, such as sensor/data sharing between vehicles with the objective to strengthen the perception of the surrounding environment. Hence a new set of applications, such as vehicles platooning, cooperative maneuver between vehicles, remote/autonomous driving may enjoy such enhanced SL framework.

FIG. 1 is a diagram illustrating exemplary NR SL unicast links between two UEs according to an embodiment of the present disclosure. For NR SL, the unicast at access stratum may be supported for services requiring high reliability. Between the same UE pair, e.g. UE A and UE B shown in FIG. 1, there may be multiple SL unicast links and each link may support multiple SL quality of service (QoS) flows/radio bearers, as described in 3GPP TS 23.287 V16.2.0 (where the entire content of this technical specification is incorporated into the present disclosure by reference). At access stratum, each link can be identified by the source and destination Layer 2 identities (L2 IDs). For instance, the PC5 unicast link 1 in FIG. 1 can be identified by the pair of L2 ID1 (e.g. corresponding to application layer ID1) and L2 ID2 (e.g. corresponding to application layer ID2).

Figure 2:
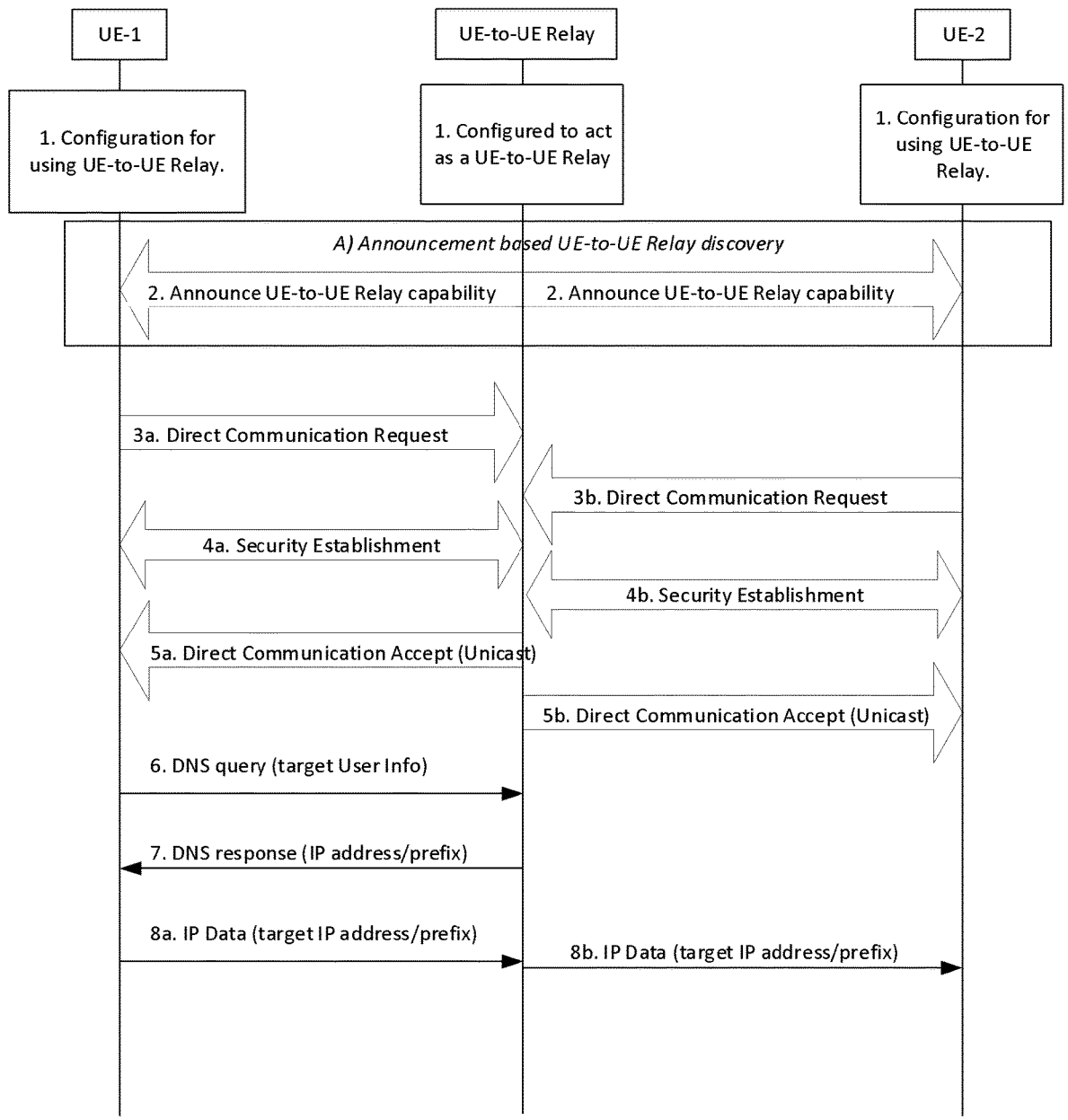
FIG. 2 is a diagram illustrating an exemplary UE-to-UE relay procedure according to an embodiment of the present disclosure.

FIG. 2 is a diagram illustrating an exemplary UE-to-UE relay procedure according to an embodiment of the present disclosure. For simplicity, FIG. 2 only depict exemplary devices/elements, e.g. UE-1, UE-2 and a UE-to-UE relay, and schematic information exchange between the devices/elements, e.g. for the 5G ProSe UE-to-UE Relay operations based on standard IP operation. As shown in FIG. 2, UE-1 and UE-2 may have configurations for using UE-to-UE relaying, and a UE authorized by the service authorization configuration may be configured to act as the UE-to-UE relay.

In accordance with an exemplary embodiment, a solution of ProSe 5G Layer-3 UE-to-UE Relay based on IP routing as described in 3GPP TS 23.752 V0.3.0 may be applied in the exemplary UE-to-UE relay procedure shown in FIG. 2. In this solution, the ProSe 5G UE-to-UE Relay operations may be supported with the following principles:

Authorization and configuration:
  Only the UE authorized by the service authorization configuration can act as a ProSe 5G UE-to-UE Relay. These UEs may be configured according to the service authorization and provisioning mechanism defined in 3GPP TS 23.287 V16.2.0 to operate in the UE-to-UE Relay mode.

ProSe 5G UE-to-UE Relay discovery:
  The ProSe 5G UE-to-UE Relay may send out a Relay Discovery message periodically, announcing its availability for serving other UEs in the area (as shown in operation A) of FIG. 2).
  The ProSe 5G UE-to-UE Relay may also support the query and response mode for discovery. The ProSe 5G UE-to-UE Relay may listen on a configured Layer-2 ID for the query, and may respond with its address and corresponding information to enable other UE to establish a unicast connection with it (as shown in operations 3a, 3b, 4a, 4b, 5a and 5b of FIG. 2). This process is similar to the unicast L2 link establishment procedure as defined in clause 6.3.3.1 of 3GPP TS 23.287 V16.2.0. It can be appreciated that the Layer-2 ID used for the discovery may be specific for UE-to-UE Relay discovery, or shared with other discoveries, e.g. UE-to-Network Relay discovery.

ProSe 5G UE-to-UE Relay operation:
  Any UE that wants to make use of the ProSe 5G UE-to-UE Relay may need to establish a unicast L2 link with the UE-to-UE Relay, with IP configuration. The ProSe 5G UE-to-UE Relay may allocate IP address/prefix to the other UEs.
  As part of the unicast L2 link establishment procedure, the ProSe 5G UE-to-UE Relay may store an association of the user information of the peer UE of the unicast link and the IP address/prefix allocated to the UE into its DNS entries. The ProSe 5G UE-to-UE Relay may act as a DNS server to other UEs.
  When a (source) UE needs to communicate with another (target) UE or needs to discover a ProSe service via the ProSe 5G UE-to-UE Relay, it sends a DNS query for the target UE (based on target user information) or for the ProSe Service to the ProSe 5G UE-to-UE Relay over the unicast link, which may return the IP address/prefix of the target UE or the ProSe Service (as shown in operations 6 and 7 of FIG. 2).
  The source UE may send the IP data or non-IP data encapsulated in IP to the target UE via the unicast L2 link to UE-to-UE Relay that returned the IP address/prefix of the target UE (as shown in operation 8a of FIG. 2). The ProSe 5G UE-to-UE Relay may act as an IP router, and forward the packets to the corresponding unicast L2 link towards the target UE (as shown in operation 8b of FIG. 2). Each of the unicast L2 link is treated as an IP interface.
  If there are multiple ProSe 5G UE-to-UE Relays in the proximity, a UE can choose either one or more ProSe 5G UE-to-UE Relays to establish the unicast L2 link based on UE implementation. For example, the source UE may send a DNS query on each of the unicast L2 link to the ProSe 5G UE-to-UE Relays. Then, the source UE may choose to use the first ProSe 5G UE-to-UE Relay that returns a positive DNS query for the target UE. It can be appreciated that the selection of the UE-to-UE Relay may be based on local configured rules on the UE, or based on other discovery solutions, e.g. "Stateful UE-to-UE Relay".

QoS handling:
  When the source UE establishes the unicast L2 link with the ProSe 5G UE-to-UE Relay, it can establish corresponding PC5 QoS flows, e.g. according to the procedure defined in clause 6.3.3.1 of 3GPP TS 23.287 V16.2.0. It can also modify the PC5 QoS flows at any time using the procedure defined in clause 6.3.3.4 of 3GPP TS 23.287 V16.2.0.
  Correspondingly, the ProSe 5G UE-to-UE Relay can also establish and modify the PC5 QoS flows using the above-mentioned procedures over the unicast L2 Link with the target UE for the forwarding of source UE's traffic.

Security handling:
  Source UE and target UE can establish bearer level security with the UE-to-UE Relay for the unicast L2 Link, e.g. using the procedures defined in 3GPP TS 23.287 V16.2.0.
  If end-to-end security protection is required between the source UE and the target UE, Internet protocol security (IPSec) may be used. It can be appreciated that the security protection of the traffic for the source UE and the target UE may be specified as required.

Charging Support:
  ProSe 5G UE-to-UE Relay can follow the charging solution defined in 3GPP TS 32.277 V15.1.0 (where the entire content of this technical specification is incorporated into the present disclosure by reference) to report the source and target UEs and corresponding traffic to the charging function.

There may be two issues in the above solution. First, the UE-to-UE relay allocates an IP address to the remote UE (e.g. UE-1 and UE-2), which may cause the remote UE changes it IP address when it changes the relaying path. Thus, the session continuity to other remote UEs may be impacted. Second, it relies on the DNS query for getting the IP address of the remote UE, which may require all UEs to support a DNS protocol and the relay may have to support the related services as a DNS server.

Various exemplary embodiments of the present disclosure propose a solution for supporting Layer-3 UE-to-UE relay. In accordance with some exemplary embodiments, when a remote UE establishes a connection with a relay UE, the remote UE may use its link-local IPv6 address as its IP address and inform this IP address to the relay UE. The relay UE may maintain a mapping between link-local IPv6 addresses and UE IDs (e.g. application layer IDs, etc.), and optionally a mapping between application user/layer IDs and PC5 unicast links. When the remote UE moves to other relay UE, the remote UE may not have to change its IP address. In this way, the session continuity and/or service continuity may be supported. In addition, the remote UE may not need to support the DNS protocol in order to resolve the IP addresses of other remote UEs.

In accordance with some exemplary embodiments, a remote UE may establish a unicast link to a relay UE for communicating with other remote UEs which may connect to that relay UE. For a specific remote UE, the traffic to other remote UEs through the same relay UE may share the same unicast link to that relay UE. When the relay UE receives a packet from a remote UE, the relay UE can forward the packet to a PC5 unicast link according to the destination IP address in the packet.

Figure 3A:
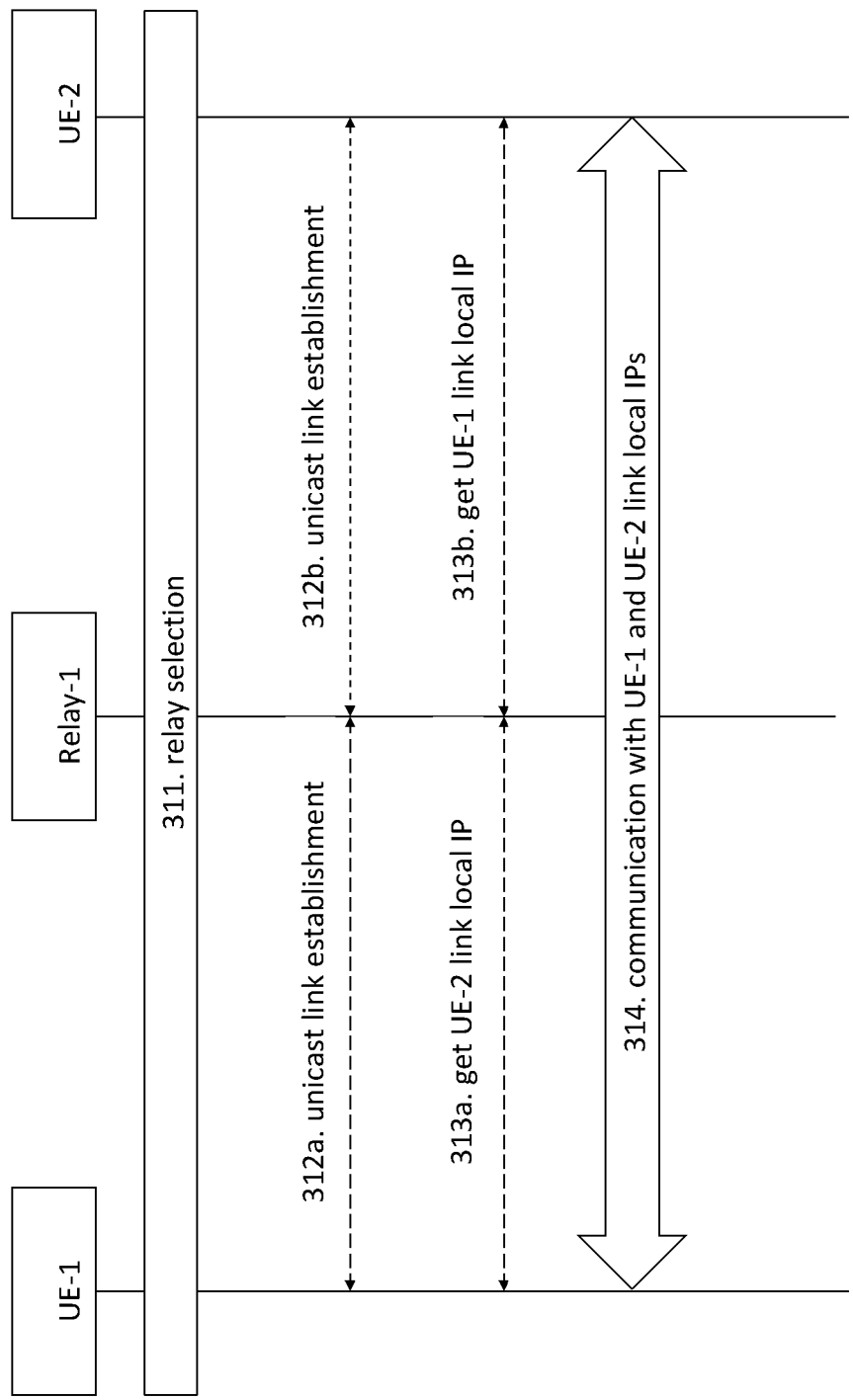
FIG. 3A is a diagram illustrating an exemplary relay path establishment procedure according to some embodiments of the present disclosure.

FIG. 3A is a diagram illustrating an exemplary relay path establishment procedure according to some embodiments of the present disclosure. In FIG. 3A, UE-1 and UE-2 may operate as remotes UEs, Relay-1 may operate as a Layer-3 UE-to-UE relay, and UE-1 may communicate with UE-2 via Relay-1. According to the exemplary relay path establishment procedure, UE-1 and UE-2 may perform the relay selection in step 311. In this step, any solution for UE-to-UE relay selection may be applied. In step 312a and step 312b, UE-1 and UE-2 may respectively establish an individual unicast link to Relay-1, if they do not have the corresponding unicast links with Relay-1 for the UE-to-UE relaying communication use case. According to an exemplary embodiment, in step 312a/312b, the remote UE (i.e. UE-1 and UE-2) may form or generate its own link-local IPv6 address e.g. based on Request For Comments (RFC) 4862, and inform the IP address to the relay UE (i.e. Relay-1). The relay UE may maintain a mapping between a UE ID (e.g. an application layer ID, etc.) and a link-local address of the remote UE.

In accordance with an exemplary embodiment, if the link-local IP address of UE-1/UE-2 conflicts with the link-local IP address of another remote UE that has already connected to Relay-1, then Relay-1 may inform UE-1/UE-2 to change its link-local IP address.

In accordance with an exemplary embodiment, if UE-1 does not know the IP address of UE-2, it may send a request to Relay-1, asking the IP address of UE-2. The request may include a UE-2 ID (e.g. an application layer ID, etc.). Then Relay-1 may give the link-local IP address of UE-2 to UE-1, as shown in step 313a of FIG. 3A. Similarly, if UE-2 does not know the IP address of UE-1, UE-2 may perform the same procedure to get the link-local IP address of UE-1, as shown in step 313b of FIG. 3A.

In the case that the unicast link between UE-1 and Relay-1 and the unicast link between UE-2 and Relay-1 are established, and UE-1 and UE-2 know each other's IP addresses, then UE-1 and UE-2 can communicate with each other via Relay-1, as shown in step 314 of FIG. 3A.

Figure 3B:
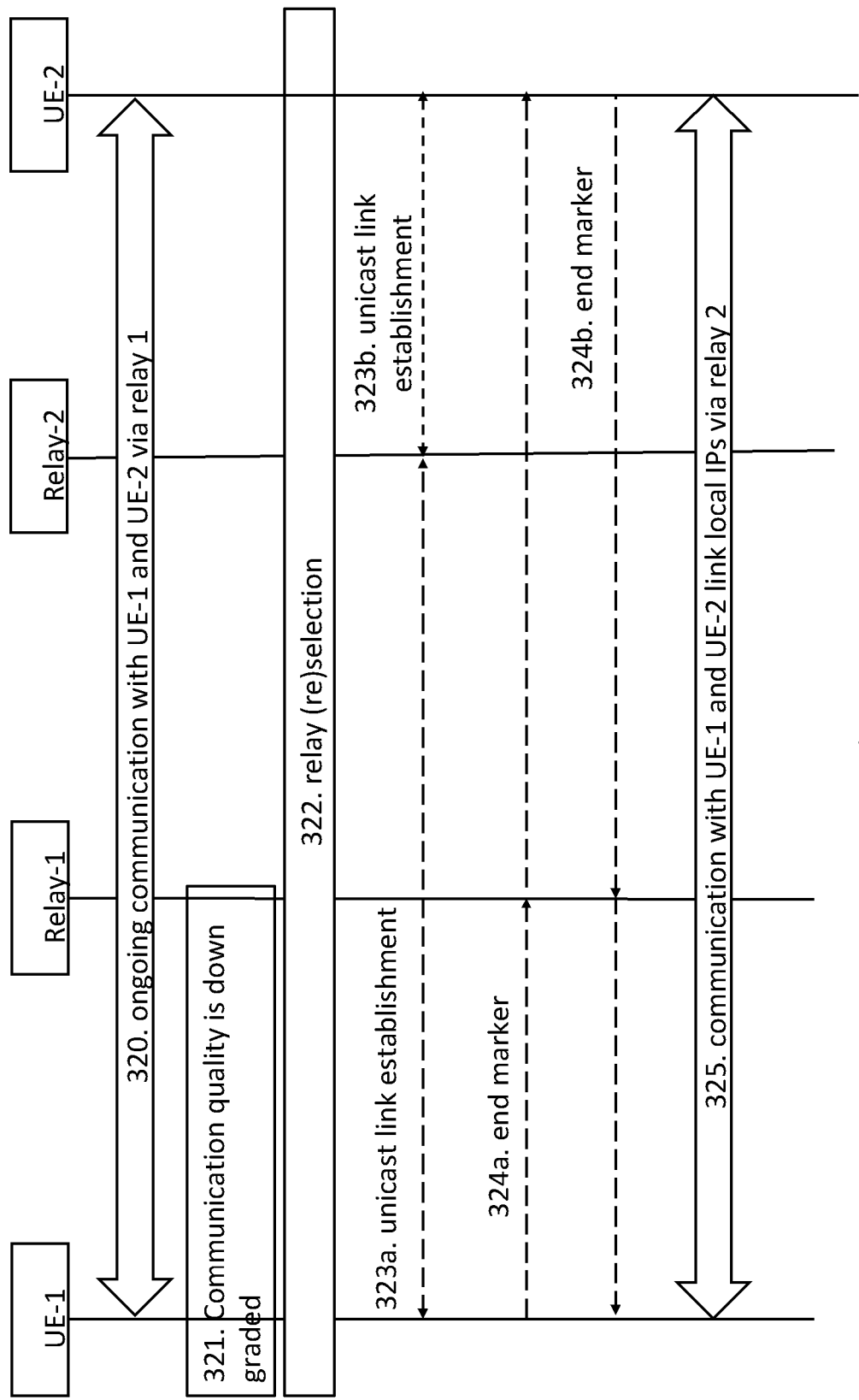
FIG. 3B is a diagram illustrating an exemplary path switch procedure according to some embodiments of the present disclosure.

FIG. 3B is a diagram illustrating an exemplary path switch procedure according to some embodiments of the present disclosure. In FIG. 3B, UE-1 and UE-2 may operate as remotes UEs, and relay-1 and relay-2 may operate as Layer-3 UE-to-UE relays. There may be an ongoing communication between UE-1 and UE-2 via Relay-1, as shown in step 320. A path switch scenario where UE-1 and UE-2 change the UE-to-UE relay from Relay-1 to Relay-2 is described with respect to FIG. 3B.

According to the exemplary path switch procedure, one of the remote UEs (e.g. UE-1) may detect in step 321 that the current UE-to-UE communication path is not good enough (e.g., the communication quality is downgraded), so the relay reselection may be executed in step 322. It can be appreciated that any suitable UE-to-UE (re)selection solution may be applied in step 322.

In accordance with an exemplary embodiment, UE-1 and/or UE-2 may establish a unicast link individually to Relay-2 in step 323a/323b. UE-1/UE-2 may keep its link-local IP address for the ongoing communication via Relay-1, and inform the IP address to Relay-2. Relay-2 may maintain a mapping between the UE ID (e.g. an application layer ID) and the link-local address. According to an embodiment, Relay-2 may check whether there is an address conflict with respect to UE-1/UE-2. If there is an address conflict, Relay-2 may inform the remote UE (e.g. UE-1/UE-2) with address conflict to regenerate an address. It can be appreciated that step 323a/323b may be skipped if the remote UE already has a unicast link with the same link-local IPv6 address to Relay-2.

In the case that UE-1 and UE-2 are ready for changing the communication path from the path via Relay-1 to the path via Relay-2, UE-1 and UE-2 may send an end marker through the old path (i.e. via Relay-1) to each other in step 324a/324b, indicating that they may start sending traffic via the new path (i.e. via Relay-2). Then UE-1 and UE-2 can communicate with each other via Relay-2, as shown in step 325 of FIG. 3B.

It is noted that some embodiments of the present disclosure are mainly described in relation to 4G/LTE or 5G/NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 4A:
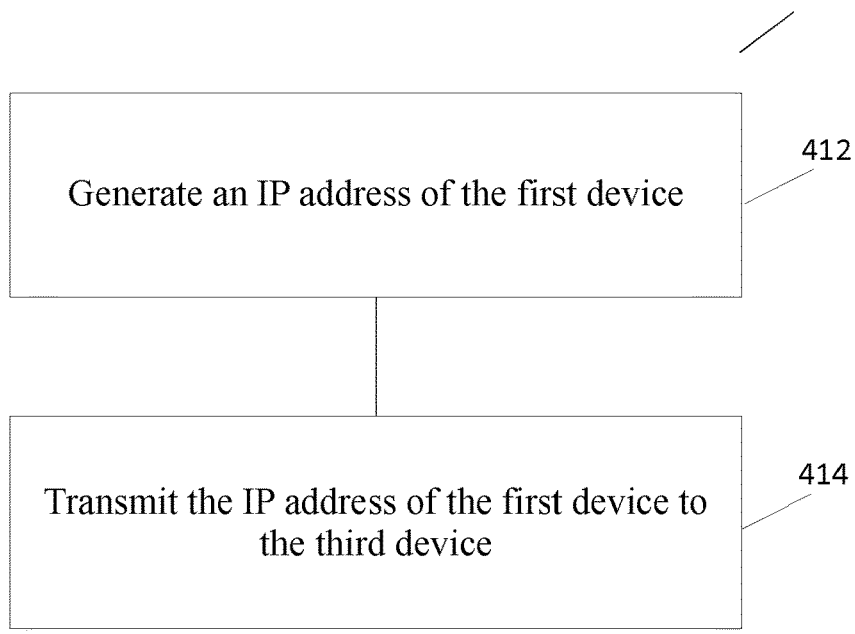
FIGS. 4A-4D are flowcharts illustrating various methods according to some embodiments of the present disclosure.

FIG. 4A is a flowchart illustrating a method 410 according to some embodiments of the present disclosure. The method 410 illustrated in FIG. 4A may be performed by a first device (e.g., UE-1 and UE-2 shown in FIGS. 3A-3B) or an apparatus communicatively coupled to the first device. In accordance with an exemplary embodiment, the first device may be configured to support direct D2D communication (e.g., V2X or SL communication, etc.) with other devices. In an exemplary embodiment, the first device may be configured to communicate with a network node such as a base station, e.g. directly or via a relay.

According to the exemplary method 410 illustrated in FIG. 4A, the first device may generate an IP address of the first device, as shown in block 412. The IP address of the first device may be applicable for direct D2D communication between the first device and a second device (e.g. UE-2 and UE-1 shown in FIGS. 3A-3B) via a third device (e.g. Relay-1 and Relay-2 shown in FIGS. 3A-3B). In accordance with an exemplary embodiment, the first device may transmit the IP address of the first device to the third device, as shown in block 414.

In accordance with an exemplary embodiment, the generation of the IP address of the first device may be triggered by setting up a connection between the first device and the third device. For example, the first device may generate its IP address when setting up a new SL connection with the third device for relaying traffic to other remote UEs. In accordance with another exemplary embodiment, the generation of the IP address of the first device may be triggered by a first indicator transmitted from the third device to the first device to indicate an IP address conflict. In this case, the IP address of the first device is a regenerated IP address by the first device to avoid the IP address conflict.

In accordance with an exemplary embodiment, the first device may transmit a message to the third device to request an IP address of the second device. As an example, the request may include an application layer identifier of the second device.

In accordance with an exemplary embodiment, the first device may obtain an IP address of the second device which may be generated by the second device, e.g. from the third device by an address request, or according to other sessions between the first device and the second device. Based at least in part on the IP address of the second device, the first device may communicate with the second device via the third device.

In accordance with an exemplary embodiment, the IP address of the first device may be a link-local IPv6 address of the first device or any other suitable address. Similarly, the IP address of the second device may be a link-local IPv6 address of the second device or any other suitable address.

Figure 4B:
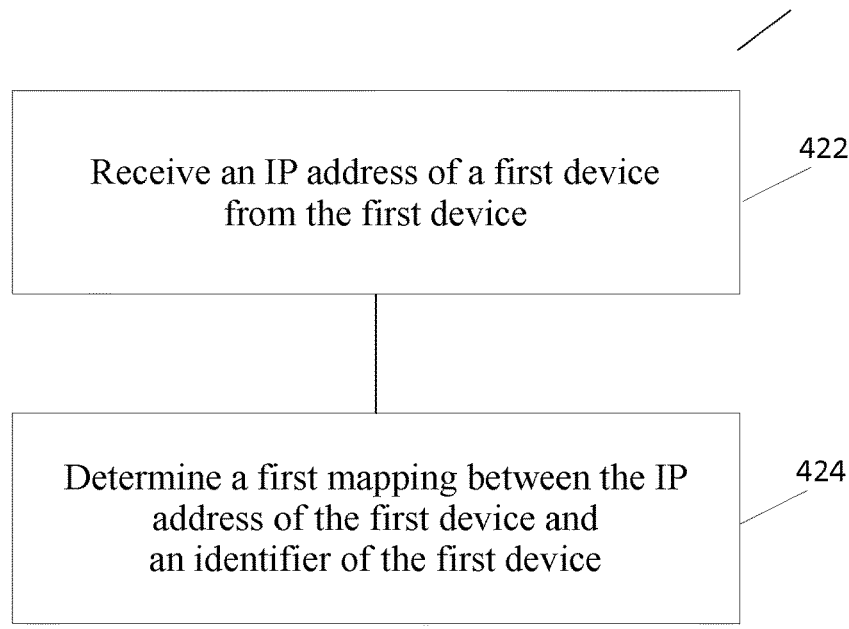

FIG. 4B is a flowchart illustrating a method 420 according to some embodiments of the present disclosure. The method 420 illustrated in FIG. 4B may be performed by a third device (e.g., Relay-1 and Relay-2 shown in FIGS. 3A-3B) or an apparatus communicatively coupled to the third device. In accordance with an exemplary embodiment, the third device may be configured to support direct D2D communication (e.g., V2X or SL communication, etc.) with other devices. In an exemplary embodiment, the third device may be configured to communicate with a network node such as a base station, e.g. directly or via a relay.

According to the exemplary method 420 illustrated in FIG. 4B, the third device may receive an IP address of a first device (e.g. the first device as described with respect to FIG. 4A) from the first device, as shown in block 422. The IP address (e.g. a link-local IPv6 address, etc.) of the first device may be generated by the first device and applicable for direct D2D communication between the first device and a second device (e.g. the second device as described with respect to FIG. 4A) via the third device. In accordance with an exemplary embodiment, the third device may determine a first mapping between the IP address of the first device and an identifier of the first device, as shown in block 424. In an embodiment, the identifier of the first device may be an application layer identifier of the first device.

It can be appreciated that the steps, operations and related configurations of the method 420 illustrated in FIG. 4B may correspond to the steps, operations and related configurations of the method 410 illustrated in FIG. 4A. It also can be appreciated that the IP address of the first device received by the third device according to the method 420 may correspond to the IP address of the first device transmitted by the first device according to the method 410. Thus, the (re) generation of the IP address of the first device according to the methods 410 and 420 may be triggered by the same or similar events/messages.

In accordance with an exemplary embodiment, the third device may receive an IP address (e.g. a link-local IPv6 address, etc.) of the second device from the second device. The IP address of the second device may be generated by the second device and applicable for the direct D2D communication between the first device and the second device via the third device. It can be appreciated that the second device may generate its IP address and inform the generated IP address to the third device, for example, by performing a method similar to the method 410 as illustrated in FIG. 4A. According to an embodiment, the generation of the IP address of the second device may be triggered by: setting up a connection between the second device and the third device, or a second indicator transmitted from the third device to the second device to indicate an IP address conflict.

In accordance with an exemplary embodiment, the third device may determine a second mapping between the IP address of the second device and an identifier of the second device. The identifier of the second device may be an application layer identifier of the second device.

In accordance with an exemplary embodiment, the third device may receive a first message from the first device to request an IP address of the second device. The first message may include an application layer identifier of the second device. Similarly, the third device may receive a second message from the second device to request the IP address of the first device, and the second message may include an application layer identifier of the first device.

In accordance with an exemplary embodiment, the third device may provide an IP address of the second device to the first device (e.g., actively or in response to the first message from the first device), according to a second mapping between the IP address of the second device and an identifier of the second device. Similarly, the third device may provide the IP address of the first device to the second device, according to the first mapping between the IP address of the first device and the identifier of the first device.

In the case that the third device establishes the respective link connections with the first device and the second device, the first device and the second device may communicate with each other via the third device. In accordance with an exemplary embodiment, the third device may forward data between the first device and the second device, according to at least one of the IP address of the first device and an IP address of the second device.

Figure 4C:
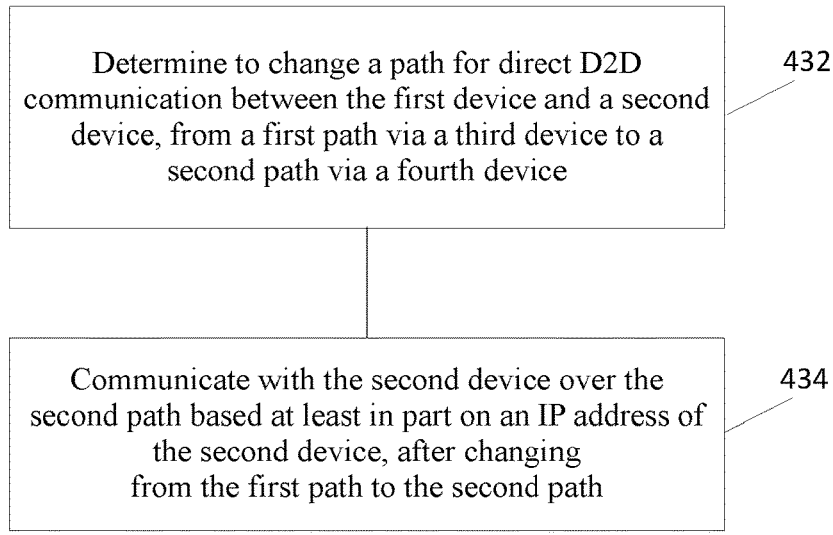

FIG. 4C is a flowchart illustrating a method 430 according to some embodiments of the present disclosure. The method 430 illustrated in FIG. 4C may be performed by a first device (e.g., UE-1 and UE-2 shown in FIGS. 3A-3B) or an apparatus communicatively coupled to the first device. In accordance with an exemplary embodiment, the first device may be configured to support direct D2D communication (e.g., V2X or SL communication, etc.) with other devices. In an exemplary embodiment, the first device may be configured to communicate with a network node such as a base station, e.g. directly or via a relay.

According to the exemplary method 430 illustrated in FIG. 4C, the first device may determine to change a path for direct D2D communication between the first device and a second device (e.g., the second device as described with respect to FIG. 4A and FIG. 4B), from a first path via a third device (e.g. the third device as described with respect to FIG. 4A and FIG. 4B) to a second path via a fourth device, as shown in block 432. After changing from the first path to the second path, the first device may communicate with the second device over the second path based at least in part on an IP address of the second device, as shown in block 434. The IP address (e.g., a link-local IPv6 address, etc.) of the second device may be generated by the second device.

It can be appreciated that the first device may establish the first path with the second device via the third device, e.g. by performing the method 410 as described with respect to FIG. 4A, and if the first device detects the first path is not good enough, then the first device may switch from the first path via the third device to the second path via the fourth device, e.g. by performing the method 420 as described with respect to FIG. 4B.

In accordance with an exemplary embodiment, the IP address of the second device may also be used for communication between the first device and the second device over the first path. In this case, the second device may not change its IP address, after the direct D2D communication between the first device and the second device is switched from the first path to the second path.

In accordance with an exemplary embodiment, the first device may generate and transmit an IP address (e.g., a link-local IPv6 address, etc.) of the first device to the fourth device, prior to changing from the first path to the second path. The transmission of the IP address of the first device to the fourth device may be in response to determining to change from the first path to the second path, or due to other relaying communications of the first device via the fourth device.

In accordance with an exemplary embodiment, the generation of the IP address of the first device may be triggered by setting up a connection between the first device and the fourth device, or a third indicator transmitted from the fourth device to the first device to indicate an IP address conflict.

In accordance with an exemplary embodiment, the IP address of the second device used for the first path may conflict with other IP addresses maintained by the fourth device. In this case, the fourth device may inform the second device to regenerate the IP address of the second device. According to an embodiment, the IP address of the second device may be received by the first device from the fourth device.

In accordance with an exemplary embodiment, the first device may transmit first information (e.g. an end marker in step 324*a* of FIG. 3B) to the second device through the first path to indicate a start of the communication over the second path. Correspondingly, the first device may receive second information (e.g. an end marker in step 324*b* of FIG. 3B) from the second device through the first path to indicate a start of the communication over the second path.

Figure 4D:
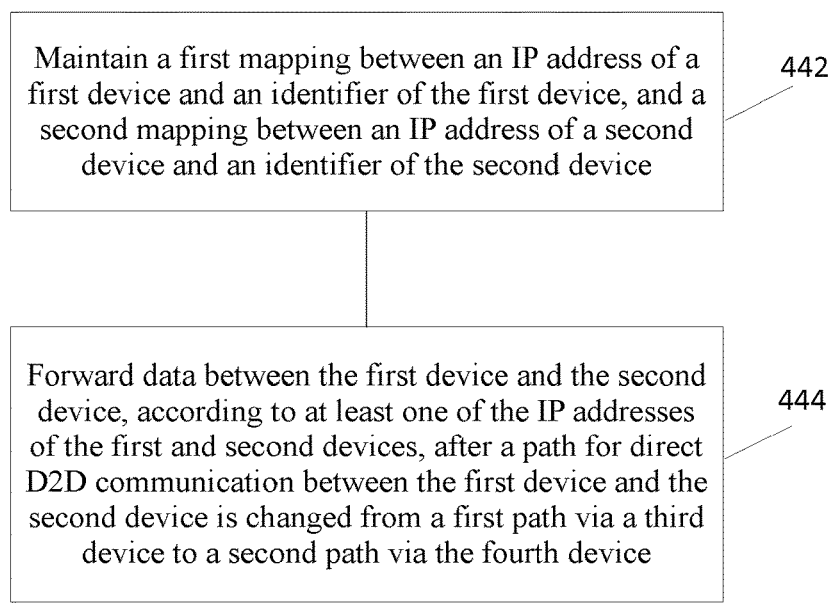

FIG. 4D is a flowchart illustrating a method 440 according to some embodiments of the present disclosure. The method 440 illustrated in FIG. 4D may be performed by a fourth device (e.g., Relay-1 and Relay-2 shown in FIGS. 3A-3B) or an apparatus communicatively coupled to the fourth device. In accordance with an exemplary embodiment, the fourth device may be configured to support direct D2D communication (e.g., V2X or SL communication, etc.) with other devices. In an exemplary embodiment, the fourth device may be configured to communicate with a network node such as a base station, e.g. directly or via a relay.

According to the exemplary method 440 illustrated in FIG. 4D, the fourth device may maintain a first mapping between an IP address of a first device and an identifier (e.g. an application layer ID, etc.) of the first device, and a second mapping between an IP address of a second device and an identifier (e.g. an application layer ID, etc.) of the second device, as shown in block 442. The IP address (e.g. an IPv6 address, etc.) of the first device may be generated by the first device, and the IP address (e.g. an IPv6 address, etc.) of the second device may be generated by the second device. After a path for direct D2D communication between the first device and the second device is changed from a first path via a third device to a second path via the fourth device, the fourth device may forward data between the first device and the second device, according to at least one of the IP address of the first device and the IP address of the second device, as shown in block 444.

It can be appreciated that the steps, operations and related configurations of the method 440 illustrated in FIG. 4D may correspond to the steps, operations and related configurations of the method 430 illustrated in FIG. 4C. It also can be appreciated that the first device, the second device, the third device and the fourth device as described with respect to FIG. 4D may correspond to the first device, the second device, the third device and the fourth device as described with respect to FIG. 4C, respectively.

In accordance with an exemplary embodiment, the at least one of the IP address of the first device and the IP address of the second device may also be used for communication between the first device and the second device over the first path. In this case, the IP address of the first device and/or the IP address of the second device may not be changed after the direct D2D communication between the first device and the second device is switched from the first path to the second path.

In accordance with an exemplary embodiment, the generation of the IP address of the first device may be triggered by setting up a connection between the first device and the fourth device. In an embodiment, the fourth device may check for an address conflict. If the IP address of the first device used for the first path may not be used for the second path (e.g. due to address conflict), the fourth device may transmit a third indicator to the first device to indicate an IP address conflict. The third indicator may trigger regeneration of the IP address of the first device for the second path. Similarly, the generation of the IP address of the second device may be triggered by: setting up a connection between the second device and the fourth device; or a fourth indicator transmitted from the fourth device to the second device to indicate an IP address conflict.

In accordance with an exemplary embodiment, the IP address of the first device may be received by the fourth device from the first device, e.g., if the fourth device have no information about the IP address of the first device. Similarly, the fourth device may receive the IP address of the second device from the second device. In the case that the IP addresses of the first and second devices are known by the fourth device before or at the time when it is determined to change the relay path, the fourth device may not need to receive the IP addresses of the first and second devices.

In accordance with an exemplary embodiment, the fourth device may provide the IP address of the first device to the second device, according to the first mapping (e.g. based on an application layer identifier of the first device). Alternatively or additionally, the fourth device may provide the IP address of the second device to the first device, according to the second mapping (e.g. based on an application layer identifier of the second device).

The various blocks shown in FIGS. 4A-4D may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 5:
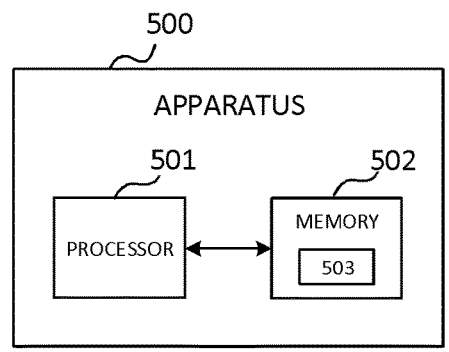
FIG. 5 is a block diagram illustrating an apparatus according to some embodiments of the present disclosure.

FIG. 5 is a block diagram illustrating an apparatus 500 according to various embodiments of the present disclosure. As shown in FIG. 5, the apparatus 500 may comprise one or more processors such as processor 501 and one or more memories such as memory 502 storing computer program codes 503. The memory 502 may be non-transitory machine/processor/computer readable storage medium. In accordance with some exemplary embodiments, the apparatus 500 may be implemented as an integrated circuit chip or module that can be plugged or installed into a first device as described with respect to FIG. 4A or FIG. 4C, a third device as described with respect to FIG. 4B, or a fourth device as described with respect to FIG. 4D. In such cases, the apparatus 500 may be implemented as a first device as described with respect to FIG. 4A or FIG. 4C, a third device as described with respect to FIG. 4B, or a fourth device as described with respect to FIG. 4D.

In some implementations, the one or more memories 502 and the computer program codes 503 may be configured to, with the one or more processors 501, cause the apparatus 500 at least to perform any operation of the method as described in connection with FIG. 4A. In other implementations, the one or more memories 502 and the computer program codes 503 may be configured to, with the one or more processors 501, cause the apparatus 500 at least to perform any operation of the method as described in connection with FIG. 4B. In other implementations, the one or more memories 502 and the computer program codes 503 may be configured to, with the one or more processors 501, cause the apparatus 500 at least to perform any operation of the method as described in connection with FIG. 4C. In other implementations, the one or more memories 502 and the computer program codes 503 may be configured to, with the one or more processors 501, cause the apparatus 500 at least to perform any operation of the method as described in connection with FIG. 4D. Alternatively or additionally, the one or more memories 502 and the computer program codes 503 may be configured to, with the one or more processors 501, cause the apparatus 500 at least to perform more or less operations to implement the proposed methods according to the exemplary embodiments of the present disclosure.

Figure 6A:
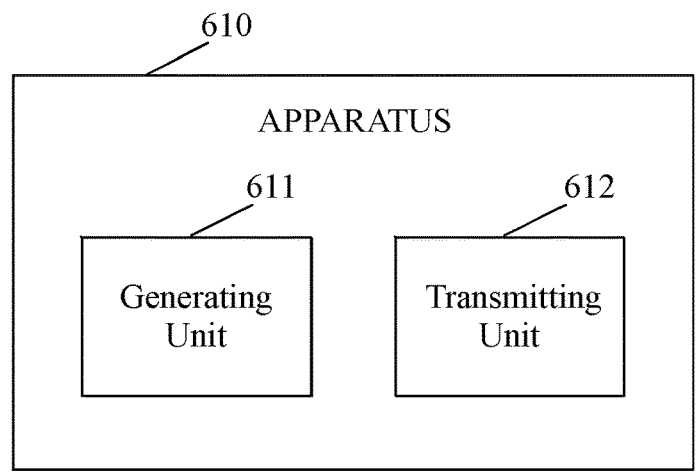
FIGS. 6A-6D are block diagrams illustrating various apparatuses according to some embodiments of the present disclosure.

FIG. 6A is a block diagram illustrating an apparatus 610 according to some embodiments of the present disclosure. As shown in FIG. 6A, the apparatus 610 may comprise a generating unit 611 and a transmitting unit 612. In an exemplary embodiment, the apparatus 610 may be implemented in a first device such as a UE. The generating unit 611 may be operable to carry out the operation in block 412, and the transmitting unit 612 may be operable to carry out the operation in block 414. Optionally, the generating unit 611 and/or the transmitting unit 612 may be operable to carry out more or less operations to implement the proposed methods according to the exemplary embodiments of the present disclosure.

Figure 6B:
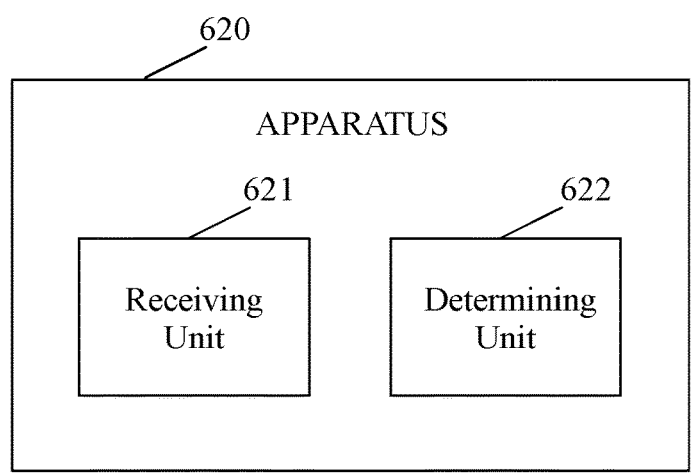

FIG. 6B is a block diagram illustrating an apparatus 620 according to some embodiments of the present disclosure. As shown in FIG. 6B, the apparatus 620 may comprise a receiving unit 621 and a determining unit 622. In an exemplary embodiment, the apparatus 620 may be implemented in a third device such as a UE. The receiving unit 621 may be operable to carry out the operation in block 422, and the determining unit 622 may be operable to carry out the operation in block 424. Optionally, the receiving unit 621 and/or the determining unit 622 may be operable to carry out more or less operations to implement the proposed methods according to the exemplary embodiments of the present disclosure.

Figure 6C:
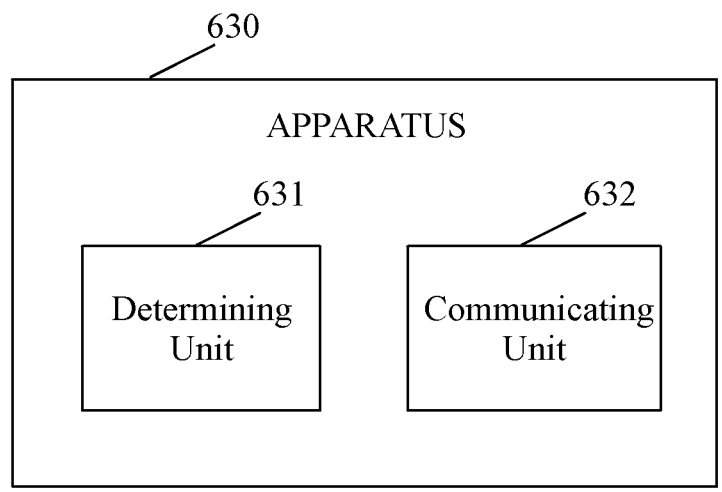

FIG. 6C is a block diagram illustrating an apparatus 630 according to some embodiments of the present disclosure. As shown in FIG. 6C, the apparatus 630 may comprise a determining unit 631 and a communicating unit 632. In an exemplary embodiment, the apparatus 630 may be implemented in a first device such as a UE. The determining unit 631 may be operable to carry out the operation in block 432, and the communicating unit 632 may be operable to carry out the operation in block 434. Optionally, the determining unit 631 and/or the communicating unit 632 may be operable to carry out more or less operations to implement the proposed methods according to the exemplary embodiments of the present disclosure.

Figure 6D:
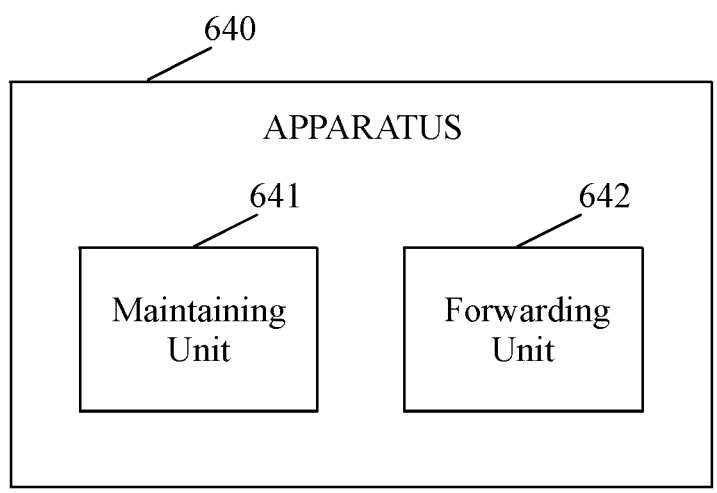

FIG. 6D is a block diagram illustrating an apparatus 640 according to some embodiments of the present disclosure. As shown in FIG. 6D, the apparatus 640 may comprise a maintaining unit 641 and a forwarding unit 642. In an exemplary embodiment, the apparatus 640 may be implemented in a fourth device such as a UE. The maintaining unit 641 may be operable to carry out the operation in block 442, and the forwarding unit 642 may be operable to carry out the operation in block 444. Optionally, the maintaining unit 641 and/or the forwarding unit 642 may be operable to carry out more or less operations to implement the proposed methods according to the exemplary embodiments of the present disclosure.

Figure 7:
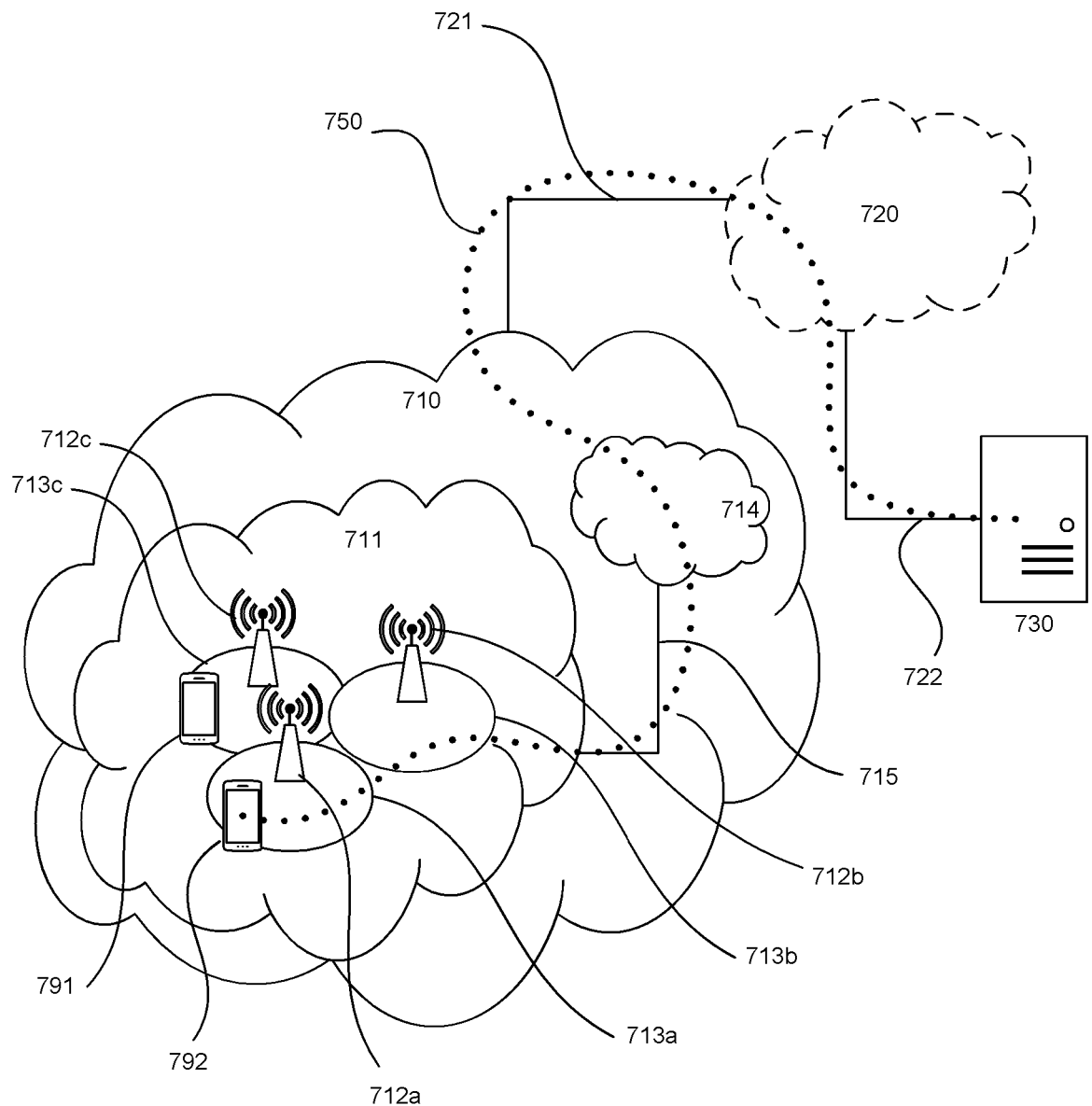
FIG. 7 is a block diagram illustrating a telecommunication network connected via an intermediate network to a host computer in accordance with some embodiments of the present disclosure.

FIG. 7 is a block diagram illustrating a telecommunication network connected via an intermediate network to a host computer in accordance with some embodiments of the present disclosure.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first UE 791 located in a coverage area 713c is configured to wirelessly connect to, or be paged by, the corresponding base station 712c. A second UE 792 in a coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. Connections 721 and 722 between the telecommunication network 710 and the host computer 730 may extend directly from the core network 714 to the host computer 730 or may go via an optional intermediate network 720. An intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, the base station 712 may not or need not be informed about the past routing of an incoming downlink communication with data originating from the host computer 730 to be forwarded (e.g., handed over) to a connected UE 791. Similarly, the base station 712 need not be aware of the future routing of an outgoing uplink communication originating from the UE 791 towards the host computer 730.

Figure 8:
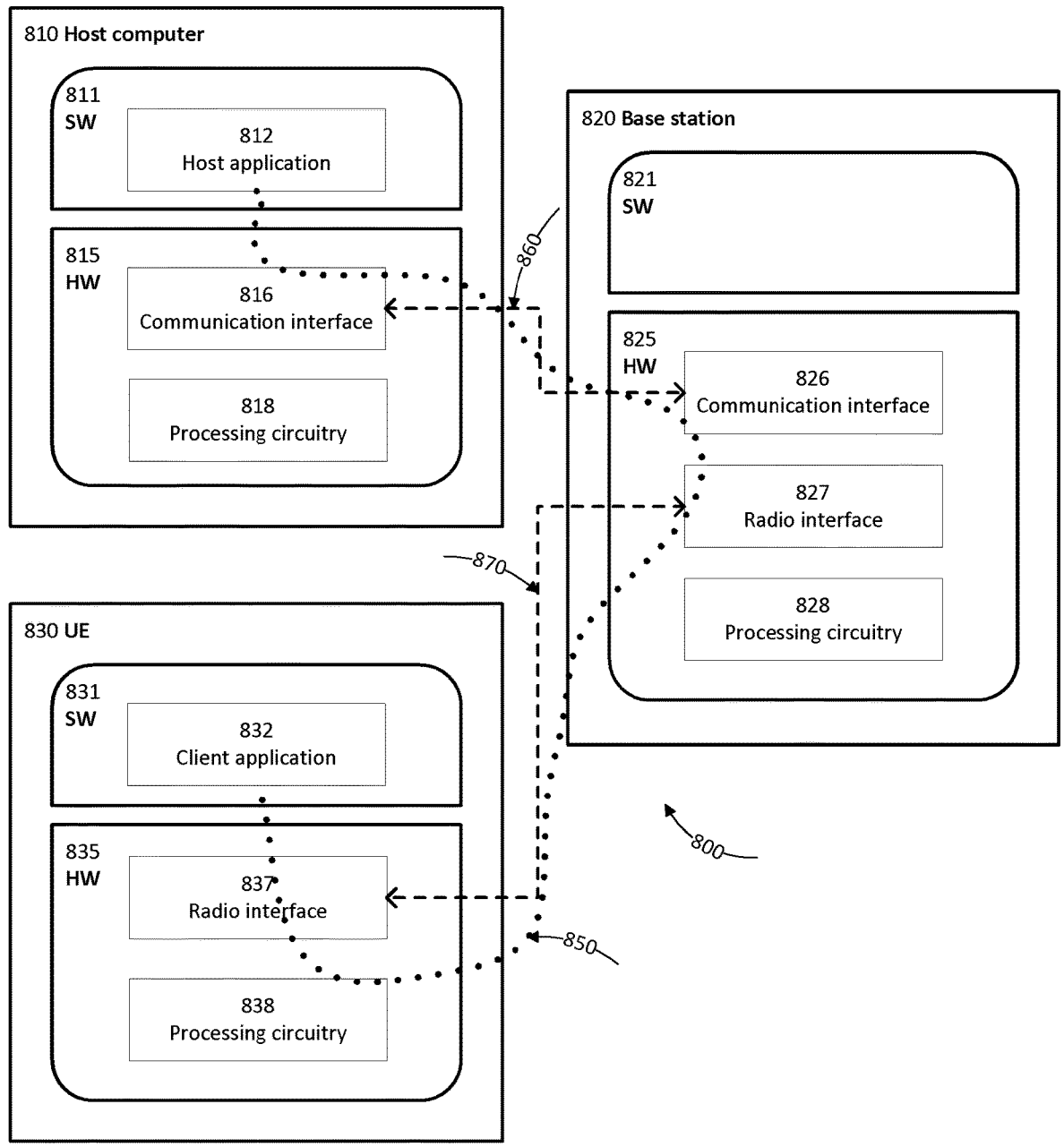
FIG. 8 is a block diagram illustrating a host computer communicating via a base station with a UE over a partially wireless connection in accordance with some embodiments of the present disclosure.

FIG. 8 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises a processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes a processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes a processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

It is noted that the host computer 810, the base station 820 and the UE 830 illustrated in FIG. 8 may be similar or identical to the host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

Wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 850 between the host computer 810 and the UE 830, in response to variations in the measurement results. The measurement procedure and/or the network functionality for reconfiguring the OTT connection 850 may be implemented in software 811 and hardware 815 of the host computer 810 or in software 831 and hardware 835 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which the software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer 810's measurements of throughput, propagation times, latency and the like. The measurements may be implemented in that the software 811 and 831 causes messages to be transmitted, in particular empty or 'dummy' messages, using the OTT connection 850 while it monitors propagation times, errors etc.

Figure 9:
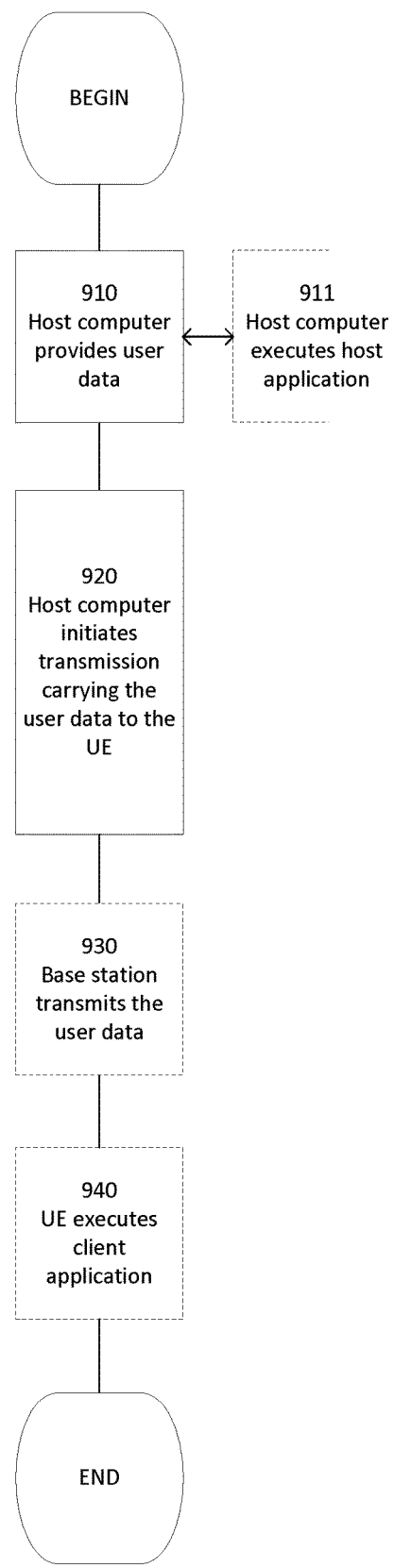
FIG. 9 is a flowchart illustrating a method implemented in a communication system, in accordance with an embodiment of the present disclosure.

FIG. 9 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
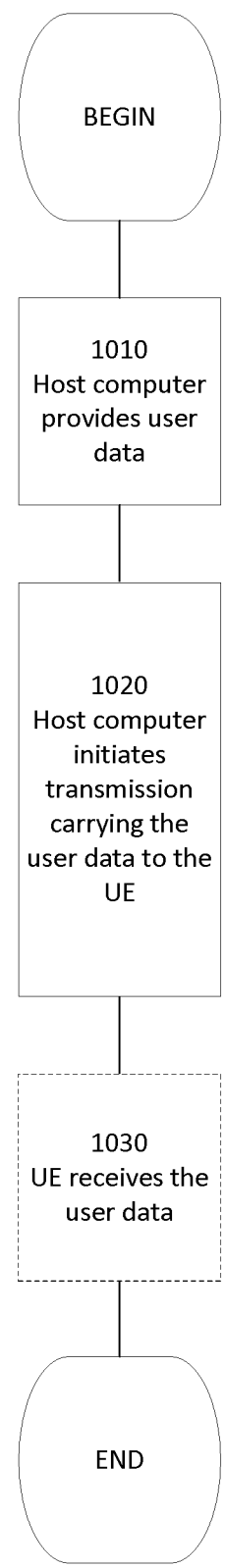
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
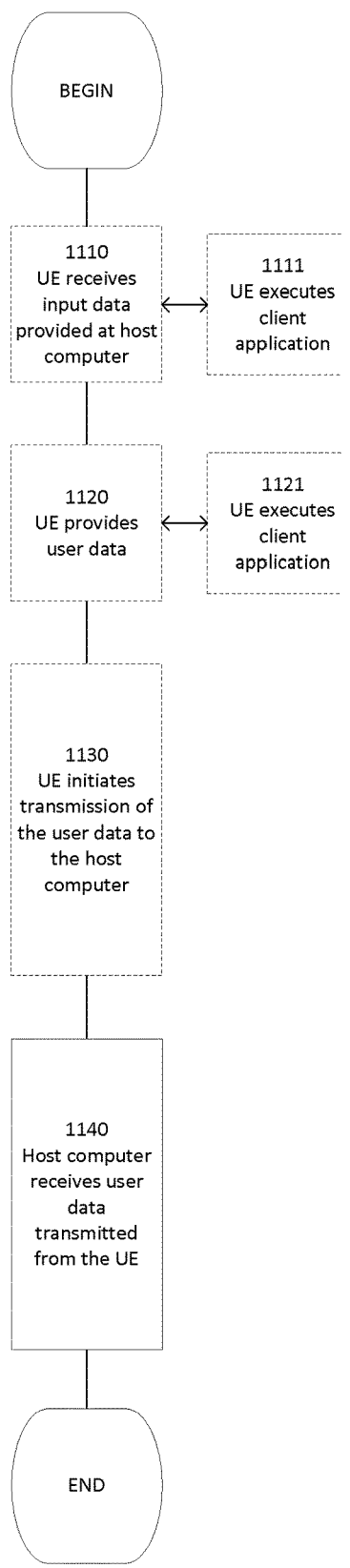
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
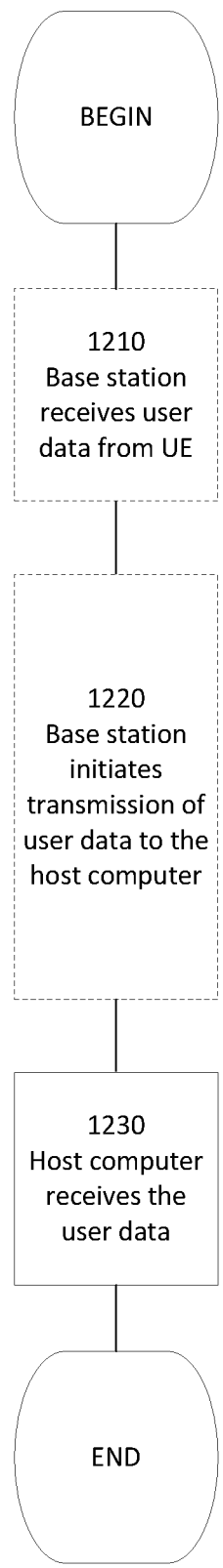
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a third device, comprising:
   receiving an Internet protocol address of a first device from the first device, wherein the Internet protocol address of the first device is a link-local Internet protocol version 6 (IPv6) address which is generated by the first device and applicable for direct device-to-device communication between the first device and a second device via the third device;

determining a first mapping between the Internet protocol address of the first device and an identifier of the first device; and receiving a first message from the first device to request an Internet protocol address of the second device, wherein the first message includes an application layer identifier of the second device.

2. The method according to claim 1, wherein the identifier of the first device is an application layer identifier of the first device.

3. The method according to claim 1, wherein the generation of the Internet protocol address of the first device is triggered by:

setting up a connection between the first device and the third device; or a first indicator transmitted from the third device to the first device to indicate an Internet protocol address conflict.

4. The method according to claim 1, further comprising:

receiving the Internet protocol address of the second device from the second device, wherein the Internet protocol address of the second device is generated by the second device and applicable for the direct device-to-device communication between the first device and the second device via the third device; and determining a second mapping between the Internet protocol address of the second device and an identifier of the second device.

5. The method according to claim 4, wherein the identifier of the second device is an application layer identifier of the second device.

6. The method according to claim 4, wherein the generation of the Internet protocol address of the second device is triggered by:

setting up a connection between the second device and the third device; or a second indicator transmitted from the third device to the second device to indicate an Internet protocol address conflict.

7. The method according to claim 1, further comprising: providing the Internet protocol address of the second device to the first device, according to a second mapping between the Internet protocol address of the second device and an identifier of the second device.

8. The method according to claim 1, further comprising: receiving a second message from the second device to request the Internet protocol address of the first device, wherein the second message includes an application layer identifier of the first device.

9. The method according to claim 1, further comprising: providing the Internet protocol address of the first device to the second device, according to the first mapping between the Internet protocol address of the first device and the identifier of the first device.

10. The method according to claim 1, further comprising: forwarding data between the first device and the second device, according to at least one of the Internet protocol address of the first device and the Internet protocol address of the second device.

11. The method according to claim 1, wherein the Internet protocol address of the second device is a link-local IPv6 address.

12. A third device, comprising:

one or more processors; and one or more memories comprising computer program codes, the one or more memories and the computer program codes configured to, with the one or more processors, cause the third device at least to:

receive an Internet protocol address of a first device from the first device, wherein the Internet protocol address of the first device is a link-local Internet protocol version 6 (IPv6) address which is generated by the first device and applicable for direct device-to-device communication between the first device and a second device via the third device;

determine a first mapping between the Internet protocol address of the first device and an identifier of the first device; and receive a first message from the first device to request an Internet protocol address of the second device, wherein the first message includes an application layer identifier of the second device.

13. A method performed by a fourth device, comprising:

maintaining a first mapping between an Internet protocol address of a first device and an identifier of the first device, and a second mapping between an Internet protocol address of a second device and an identifier of the second device, wherein the Internet protocol address of the first device is generated by the first device, and the Internet protocol address of the second device is generated by the second device; and forwarding data between the first device and the second device, according to at least one of the Internet protocol address of the first device and the Internet protocol address of the second device, after a path for direct device-to-device communication between the first device and the second device is changed from a first path via a third device to a second path via the fourth device.

14. The method according to claim 13, wherein the at least one of the Internet protocol address of the first device and the Internet protocol address of the second device is also used for communication between the first device and the second device over the first path.

15. The method according to claim 13, wherein the generation of the Internet protocol address of the first device is triggered by:

setting up a connection between the first device and the fourth device; or a third indicator transmitted from the fourth device to the first device to indicate an Internet protocol address conflict.

16. The method according to claim 13, wherein the generation of the Internet protocol address of the second device is triggered by:

setting up a connection between the second device and the fourth device; or a fourth indicator transmitted from the fourth device to the second device to indicate an Internet protocol address conflict.

17. The method according to claim 13, wherein the Internet protocol address of the first device is received by the fourth device from the first device, and the Internet protocol address of the second device is received by the fourth device from the second device.

18. The method according to claim 13, further comprising:

providing the Internet protocol address of the first device to the second device, according to the first mapping.

19. The method according to claim 13, further comprising:
  providing the Internet protocol address of the second device to the first device, according to the second mapping.

* * * * *